(12) United States Patent
Sogamoto (10) Patent No.: US 11,629,532 B2
(45) Date of Patent: Apr. 18, 2023

(54) STRIKER

(71) Applicant: TOYOTA BOSHOKU KABUSHIKI KAISHA, Aichi (JP)

(72) Inventor: Daichi Sogamoto, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 296 days.

(21) Appl. No.: 16/890,349

(22) Filed: Jun. 2, 2020

(65) Prior Publication Data
US 2020/0386018 A1 Dec. 10, 2020

(30) Foreign Application Priority Data
Jun. 6, 2019 (JP) .............................. JP2019-106175

(51) Int. Cl.
*E05B 85/04* (2014.01)
*B60N 2/90* (2018.01)

(52) U.S. Cl.
CPC .............. *E05B 85/04* (2013.01); *B60N 2/919* (2018.02); *B60N 2002/952* (2018.02)

(58) Field of Classification Search
None
See application file for complete search history.

(56) References Cited

U.S. PATENT DOCUMENTS

| | | | | |
|---|---|---|---|---|
| 9,346,373 B2* | 5/2016 | Cai | ......................... | B60N 2/366 |
| 2008/0217932 A1* | 9/2008 | Yamada | .................. | B60N 2/366 |
| | | | | 292/340 |
| 2012/0228910 A1* | 9/2012 | Kim | ..................... | B60N 2/1842 |
| | | | | 297/257 |
| 2013/0169021 A1* | 7/2013 | Jinno | ..................... | B60N 2/919 |
| | | | | 297/463.1 |

(Continued)

FOREIGN PATENT DOCUMENTS

| | | | | |
|---|---|---|---|---|
| DE | 102009021830 A1 * | 11/2010 | ........... | B60N 2/2245 |
| EP | 1810871 A2 * | 7/2007 | ........... | B60N 2/2245 |

(Continued)

OTHER PUBLICATIONS

Notice of Reasons for Refusal dated Oct. 4, 2022 in the corresponding Japanese patent application No. 2019-106175 and its machine-generated English translation.

*Primary Examiner* — David E Allred
(74) *Attorney, Agent, or Firm* — Greenblum & Bernstein, P.L.C.

(57) ABSTRACT

A striker applied to a vehicle seat includes an engagement pin having a bar shape and a mounting bracket. The mounting bracket includes: a covering portion that covers a part of a lateral surface of the engagement pin from outside and to which one end portion of the engagement pin along a longitudinal axis of the engagement pin is fixed; and a mounting portion that is mounted to a vehicle seat or a vehicle. When directions perpendicular to the longitudinal axis of the engagement pin are regarded as first directions (Continued)

and directions approximately corresponding to seat front-rear directions are regarded as second directions in a state where the mounting portion is mounted, the covering portion is provided with a first load receiving portion that is approximately perpendicular to the first directions and a second load receiving portion that is approximately perpendicular to the second directions.

12 Claims, 8 Drawing Sheets

(56) References Cited

U.S. PATENT DOCUMENTS

| | | | | |
|---|---|---|---|---|
| 2014/0138979 A1* | 5/2014 | Tanaka | ............... | B60N 2/2245 |
| | | | | 296/65.03 |
| 2014/0312671 A1* | 10/2014 | Kawamoto | ............. | B60N 2/36 |
| | | | | 297/354.1 |
| 2014/0327266 A1* | 11/2014 | Gholap | ............... | B60N 2/919 |
| | | | | 296/65.16 |
| 2015/0014999 A1 | 1/2015 | Fujii et al. | | |
| 2015/0137547 A1* | 5/2015 | Cai | ..................... | B60N 2/015 |
| | | | | 296/63 |
| 2018/0037142 A1* | 2/2018 | Okuma | ................... | B60N 2/80 |
| 2022/0074240 A1* | 3/2022 | Aldersley | ............. | E05B 85/045 |

FOREIGN PATENT DOCUMENTS

| | | |
|---|---|---|
| JP | 2012071701 A | 4/2012 |
| JP | 6242617 | 12/2017 |

* cited by examiner

STRIKER

CROSS-REFERENCE TO RELATED APPLICATIONS

The present application claims the benefit of Japanese Patent Application No. 2019-106175 filed on Jun. 6, 2019 with the Japan Patent Office, the entire disclosure of which is incorporated herein by reference.

BACKGROUND

The present disclosure relates to a striker that restricts a displacement of a vehicle seat.

For example, a striker disclosed in Japanese Patent No. 6242617 includes an engagement target portion that is curved in substantially a U-shape, a fixing portion to which the engagement target portion is fixed, and the like. In this striker, the engagement target portion is fixed to the fixing portion, which configures a mounting bracket, by riveting.

Further, in the above striker, a reinforcing bracket is fixed to the fixing portion. When the engagement target portion is bent and deformed to specified dimensions or more, the reinforcing bracket restricts development of the bending deformation.

In a state where a load does not act on the engagement target portion, there exists a gap between the engagement target portion and the reinforcing bracket. When the engagement target portion is bent and deformed to specified dimensions or more, the reinforcing bracket and the engagement target portion contact each other, to thereby restrict development of the bending deformation.

SUMMARY

The present disclosure discloses examples of a striker that can have an enhanced strength without use of a reinforcing bracket.

A striker applied to a vehicle seat according to one aspect of the present disclosure comprises an engagement pin that is formed of metal and has a bar shape and a mounting bracket to which the engagement pin is fixed. The mounting bracket includes a covering portion that covers a part of a lateral surface of the engagement pin from outside and to which one end portion of the engagement pin along a longitudinal axis of the engagement pin is fixed. The mounting bracket also includes a mounting portion that is mounted to a vehicle seat or a vehicle. When directions perpendicular to the longitudinal axis of the engagement pin are regarded as first directions and directions approximately corresponding to seat front-rear directions are regarded as second directions in a state where the mounting portion is mounted, the covering portion is provided with a first load receiving portion that is approximately perpendicular to the first directions and a second load receiving portion that is approximately perpendicular to the second directions.

With the above configuration, in the above striker, the second load receiving portion can receive at least some of loads acting on the engagement pin in the seat front-rear directions. Consequently, it is possible to enhance a strength of the striker.

The above striker may be configured, for example, as follows.

It is desirable that, in the state where the mounting portion is mounted, the second load receiving portion is situated on a seat front side compared to the engagement pin and is provided with a weld bead that joins the second load receiving portion and the engagement pin to each other.

With the above configuration, the load, which acts on the engagement pin in a seat front direction, acts on the engagement pin as a force that mainly bends and deforms the engagement pin. As a result, occurrence of a large shearing force in the weld bead can be inhibited. Accordingly, it is possible to enhance a strength of the striker.

In a configuration of the mounting bracket in which the second load receiving portion is provided on the seat front side compared to the engagement pin in the state where the mounting portion is mounted, there may not be a portion of the mounting bracket that is approximately perpendicular to the seat front-rear directions, in other words, a portion corresponding to the second load receiving portion, on a seat rear side compared to the engagement pin.

It is desirable that the mounting bracket is provided with a curved portion that receives a load acting on the second load receiving portion and that is curved in approximately a U-shape.

With the above configuration, when a large load acts on the engagement pin in the seat front-rear directions, the curved portion is deformed to thereby absorb the load. Accordingly, occurrence of a large shearing force in the weld bead can be inhibited, which can therefore enhance a strength of the striker.

It is desirable that the covering portion and the curved portion are a one-piece article that is formed with a single metal plate. Further, it is desirable that the engagement pin has a cylindrical shape, the covering portion is arcuately curved to follow an outer circumferential surface of the engagement pin, and the covering portion and the curved portion are a one-piece article formed with a single metal plate that is curved to draw approximately the letter S.

BRIEF DESCRIPTION OF THE DRAWINGS

Hereinafter, embodiments of the present disclosure will be described by way of example with reference to the accompanying drawings, in which.

DETAILED DESCRIPTION OF EXEMPLARY EMBODIMENTS

Each of embodiments to be described below is an example of embodiments that fall within the technical scope of the present disclosure. Matters specifying the invention recited in claims are not limited to specific configurations, structures, and the like that are shown in the embodiments below.

The present embodiment is an example in which a striker of the present disclosure is applied to a seat to be mounted to a vehicle such as an automobile or the like (hereinafter, referred to as a "vehicle seat"). Arrows that indicate directions labelled on the drawings are made for easy understanding of relationships between the drawings and for easy understanding of shapes and the like of members and/or portions shown in the drawings.

Therefore, the striker is not limited to the directions labelled on the drawings. The directions shown in the drawings are based on a state where the vehicle seat of the present embodiment is assembled to a vehicle.

A member and/or a portion to be described below may be plural in number.

First Embodiment

1. Overview of Vehicle Seat

Figure 1:
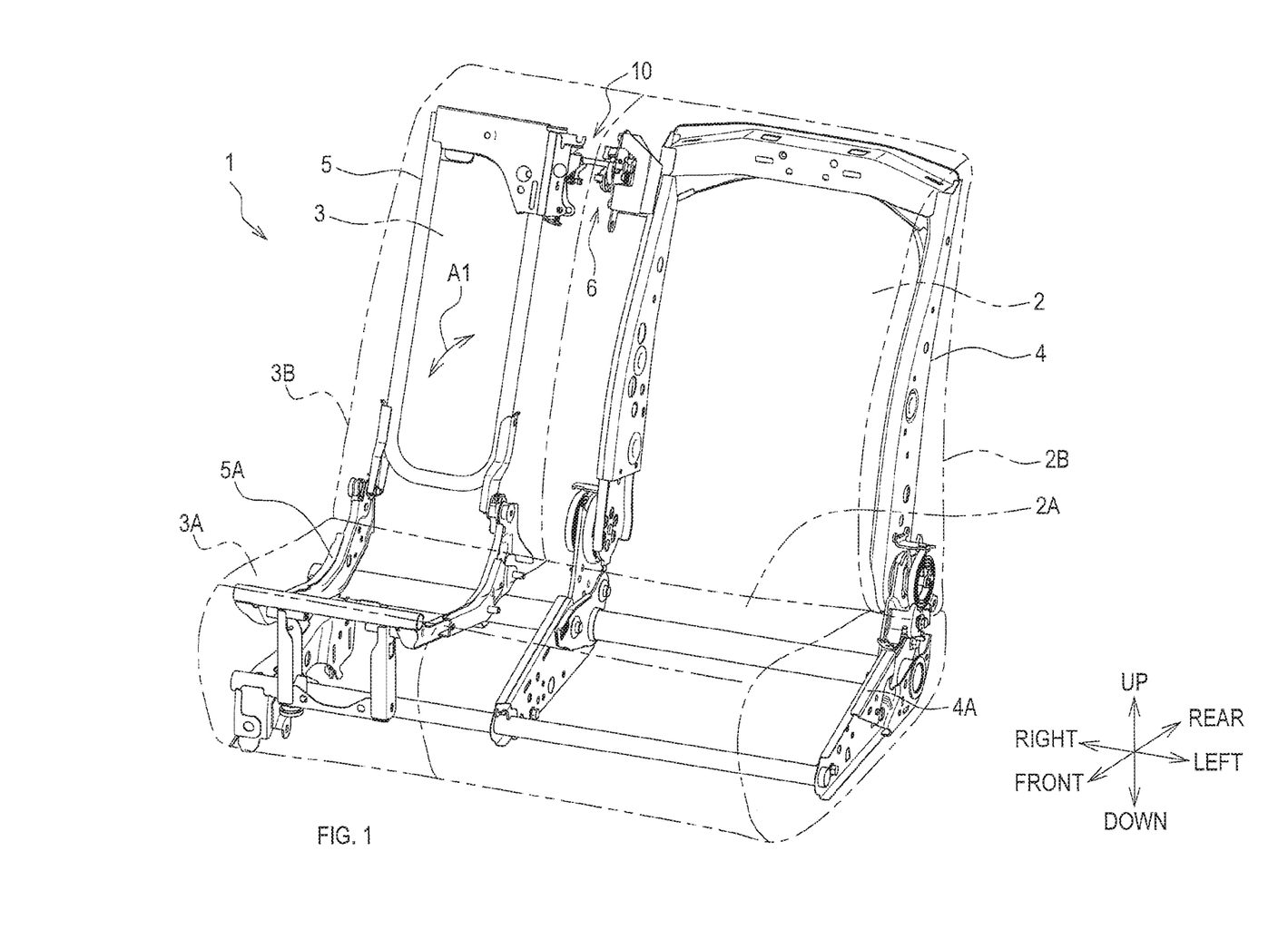
FIG. 1 is a view showing a vehicle seat of a first embodiment.

The present embodiment is an example in which the present disclosure is applied to a vehicle seat 1 for a vehicle rear seat. The vehicle seat 1 comprises, as shown in FIG. 1, two seats that are integrated with each other. Specifically, the vehicle seat 1 comprises a first seat 2 (for example, a left seat 2) situated on one end side of the vehicle seat 1 along a seat-width axis (for example, left side of the vehicle seat 1) and a second seat 3 (hereinafter, referred to as a "center seat 3") situated at approximately the center of the vehicle seat 1 along the seat-width axis.

The left seat 2 includes at least a left seat cushion 2A and a left seatback 2B. The center seat 3 includes at least a center seat cushion 3A and a center seatback 3B. The left seat cushion 2A and the center seat cushion 3A support the buttocks of occupants. The left seatback 2B and the center seatback 3B support the backs of the occupants.

A left back frame 4 forms a framework of the left seatback 2B. A center back frame 5 forms a framework of the center seatback 3B. A left cushion frame 4A forms a framework of the left seat cushion 2A. A center cushion frame 5A forms a framework of the center seat cushion 3A.

The center seatback 3B of the center seat 3 is rotatable with respect to the center seat cushion 3A of the center seat 3 in seat front-rear directions (see, arrows A1 of FIG. 1). In other words, the center back frame 5 is coupled to the center cushion frame 5A such that the center back frame 5 can rotate with respect to the center cushion frame 5A in the seat front-rear directions.

The center seatback 3B is rotatable between a standing position and a position in which the center seatback 3B tilts toward a front side of the center seat 3 from the standing position (hereinafter, referred to as a "tilt position"). FIG. 1 shows the center seatback 3B, which is placed in the standing position.

The center back frame 5 is provided with a striker 10 on its one side surface near its top, on a side facing the left back frame 4. The left back frame 4 is provided with an engagement device 6 on its one side surface near its top, on a side facing the center back frame 5.

Figure 2:
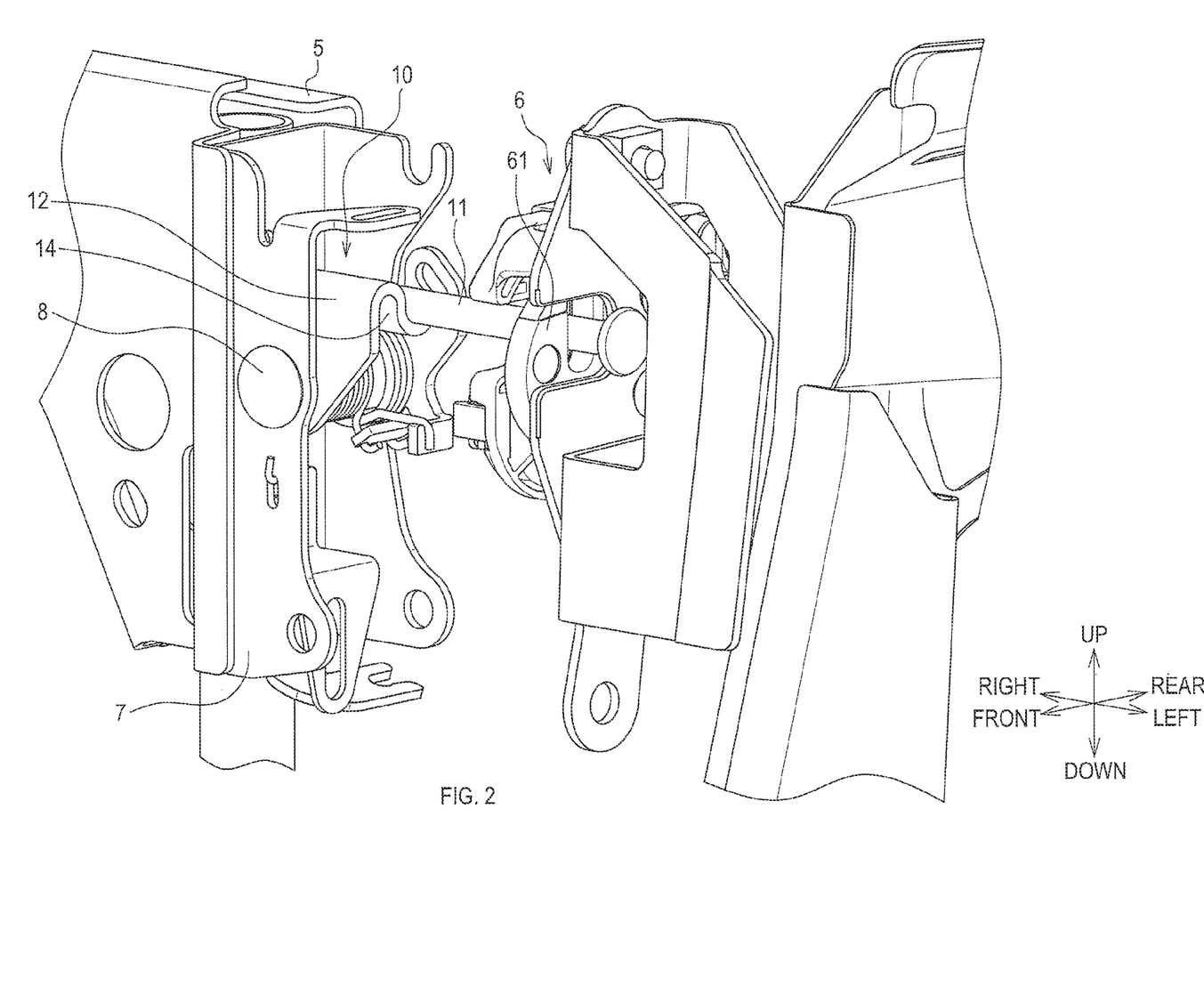
FIG. 2 is a view showing a striker and an engagement device of the first embodiment.

As shown in FIG. 2, the engagement device 6 includes an engagement portion 61, such as a latch, a hook, or the like, so the engagement portion 61 is engageable with the striker 10. In a state where the striker 10 and the engagement device 6 are engaged with each other as shown in FIG. 2, the center seatback 3B is kept in the standing position. In a state where the engagement is released, the center seatback 3B is placed in a rotatable state.

2. Striker 2.1 Overview of Striker

Figure 3:
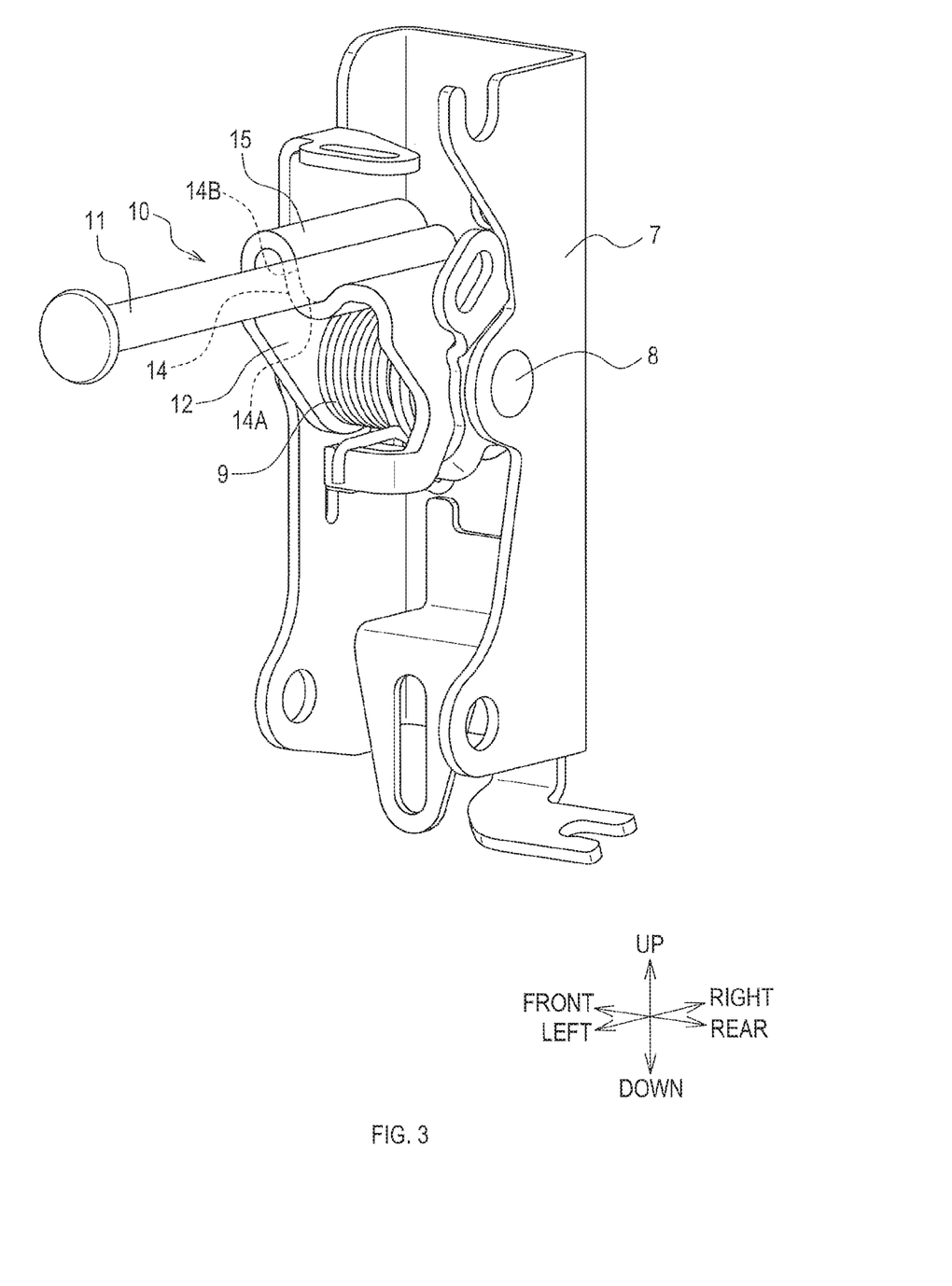
FIG. 3 is a view showing the striker of the first embodiment.

As shown in FIG. 3, the striker 10 includes at least an engagement pin 11 and a mounting bracket 12. The engagement pin 11 is a metal member having a bar shape. The engagement pin 11 is engageable with the engagement portion 61.

Figure 4:
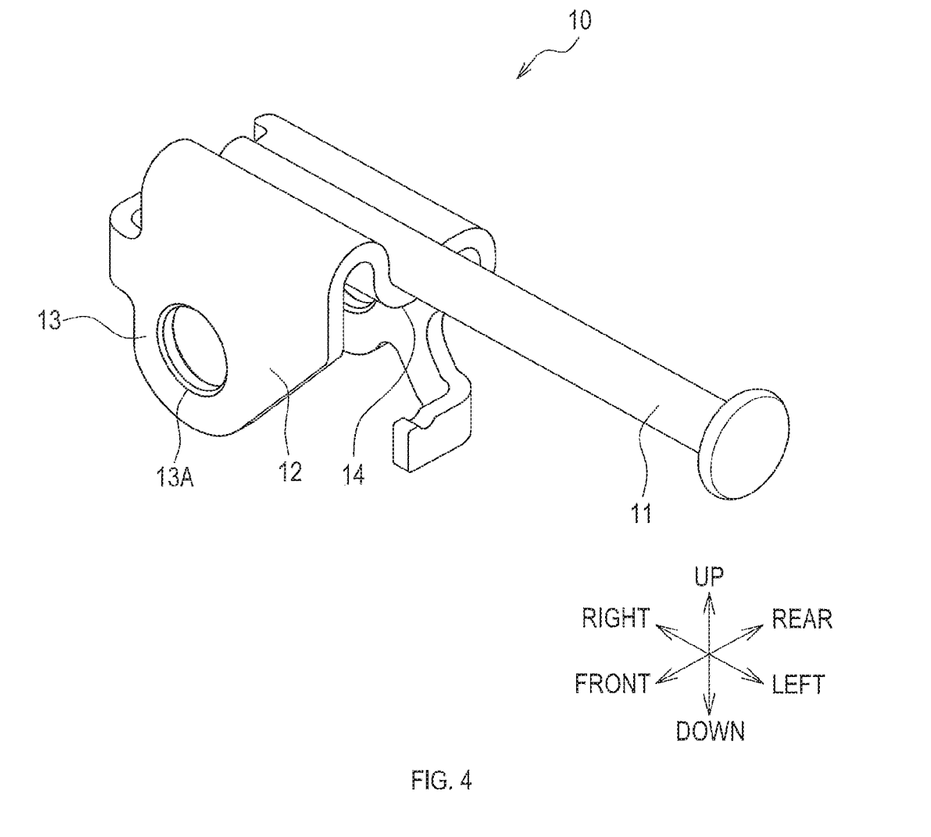
FIG. 4 is a view showing the striker of the first embodiment.

As shown in FIG. 4, the mounting bracket 12 is a member to which the engagement pin 11 is fixed. As shown in FIG. 3, the mounting bracket 12 of the present embodiment is fixed to the center back frame 5 via an attachment bracket 7.

The attachment bracket 7 is fixed to the center back frame 5 such that the attachment bracket 7 is immobile with respect to the center back frame 5. The mounting bracket 12 is fixed to the attachment bracket 7 via a coupling pin 8 such that the mounting bracket 12 is rotatable while being coupled to the attachment bracket 7.

The mounting bracket 12, specifically, the engagement pin 11 is rotatable between an engagement position and a retrieved position. The engagement position enables the engagement pin 11 and the engagement portion 61 to be engaged with each other (the position shown in FIG. 3).

In the retrieved position, the engagement pin 11 and the engagement portion 61 cannot be engaged with each other. Specifically, in the retrieved position, a leading end of the engagement pin 11 is rotated and displaced downward as compared to a position of the leading end where the engagement pin 11 is placed in the engagement position. A spring 9 is a resilient body that exhibits a resilient force for keeping the mounting bracket 12 in the engagement position.

2.2 Details of Mounting Bracket

<Overview of Configuration>

As shown in FIG. 4, the mounting bracket 12 includes at least a mounting portion 13 and a covering portion 14. The mounting portion 13 is a portion to be mounted to the vehicle seat 1 or a vehicle (in the present embodiment, the attachment bracket 7 of the vehicle seat 1). Specifically, the mounting portion 13 is provided with a through hole 13A through which the coupling pin 8 is inserted.

<Covering Portion>

Figure 5:
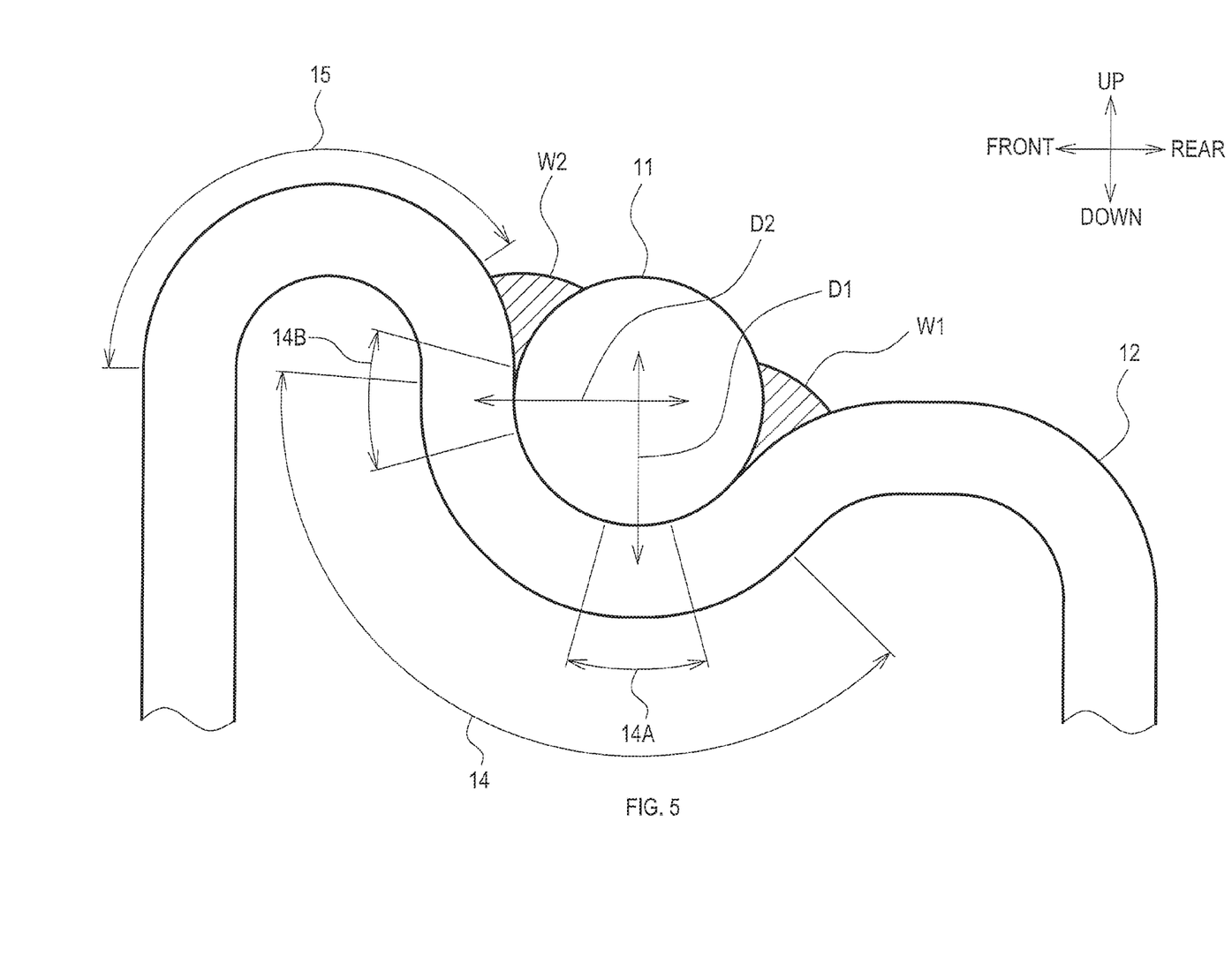
FIG. 5 is a view showing the striker of the first embodiment.

The covering portion 14 is a portion to which one end portion of the engagement pin 11 along a longitudinal axis of the engagement pin 11 is fixed. In the present embodiment, as shown in FIG. 5, the one end portion of the engagement pin 11 is fixed to the covering portion 14 by welding. Therefore, a welded portion between the one end portion of the engagement pin 11 and the covering portion 14 includes weld beads W1 and W2.

The covering portion 14 covers a part of a lateral surface of the engagement pin 11 from outside. Specifically, the covering portion 14 is arcuately curved to follow a part of an outer circumferential surface of the engagement pin 11, which has a cylindrical shape.

The covering portion 14 is provided with a first load receiving portion 14A that is approximately perpendicular to first directions D1 and a second load receiving portion 14B that is approximately perpendicular to second directions D2. The first directions D1 are perpendicular to the longitudinal axis of the engagement pin 11. The first directions D1 of the present embodiment approximately correspond to vertical directions when the seatback 3B is placed in the standing position.

The second directions D2 approximately correspond to the seat front-rear directions when the mounting portion 13 is mounted to the attachment bracket 7 and the engagement pin 11 is placed in the engagement position, in other words, when the seatback 3B is placed in the standing position.

The second load receiving portion 14B of the present embodiment is situated on a seat front side compared to the engagement pin 11 when the center seatback 3B is placed in the standing position. There is no portion in the mounting bracket 12 that is situated on a seat rear side compared to the engagement pin 11 and approximately perpendicular to the seat front-rear directions when the center seatback 3B is placed in the standing position.

In other words, except the weld bead W1, there is no portion on a side opposite to the second load receiving portion 14B across the engagement pin 11 in seat front-rear directions to resist a load acting in the seat front-rear directions. The weld bead W2 joins the second load receiving portion 14B and the engagement pin 11 to each other.

In FIG. 5, the first load receiving portion 14A and, in particular, the second load receiving portion 14B are illustrated to have respective specified ranges. This is because there may be a case where the standing position is variable or the first directions D1 have a deviation from up-down directions.

<Curved Portion>

The mounting bracket 12 is provided with a curved portion 15. The curved portion 15 can receive a load acting on the second load receiving portion 14B and is curved in approximately a U-shape. Specifically, the load, which acts on the second load receiving portion 14B in the seat front direction, is transmitted to the attachment bracket 7, specifically, to the center back frame 5 via the curved portion 15.

The covering portion 14 and the curved portion 15 are a one-piece article that is formed with a single metal plate. In other words, the covering portion 14 and the curved portion 15 are a one-piece article formed with a single metal plate that is curved to draw approximately the letter S (in FIG. 5, the reversed letter S).

Specifically, the mounting bracket 12 includes the covering portion 14 and the curved portion 15 and is a member formed such that a single metal plate is applied with plastic forming processing such as pressing to be curved to draw approximately the letter S (in FIG. 5, the reversed letter S).

3. Features of Vehicle Seat (Particularly, Striker) of the Present Embodiment

The covering portion 14, which covers the lateral surface of the engagement pin 11 from outside, is provided with the first load receiving portion 14A that is approximately perpendicular to the first directions D1 and the second load receiving portion 14B that is approximately perpendicular to the second directions D2 (the seat front-rear directions).

With the above configuration, in the striker 10, the second load receiving portion 14B can receive at least some of loads that act on the engagement pin 11 in the seat front-rear directions (in FIG. 5, loads acting in the seat front direction). Consequently, it is possible to enhance a strength of the striker 10.

The second load receiving portion 14B is situated on the seat front side compared to the engagement pin 11 when the seatback 3B is placed in the standing position and is provided with the weld bead W2 that joins the second load receiving portion 14B and the engagement pin 11 to each other.

Figure 6:
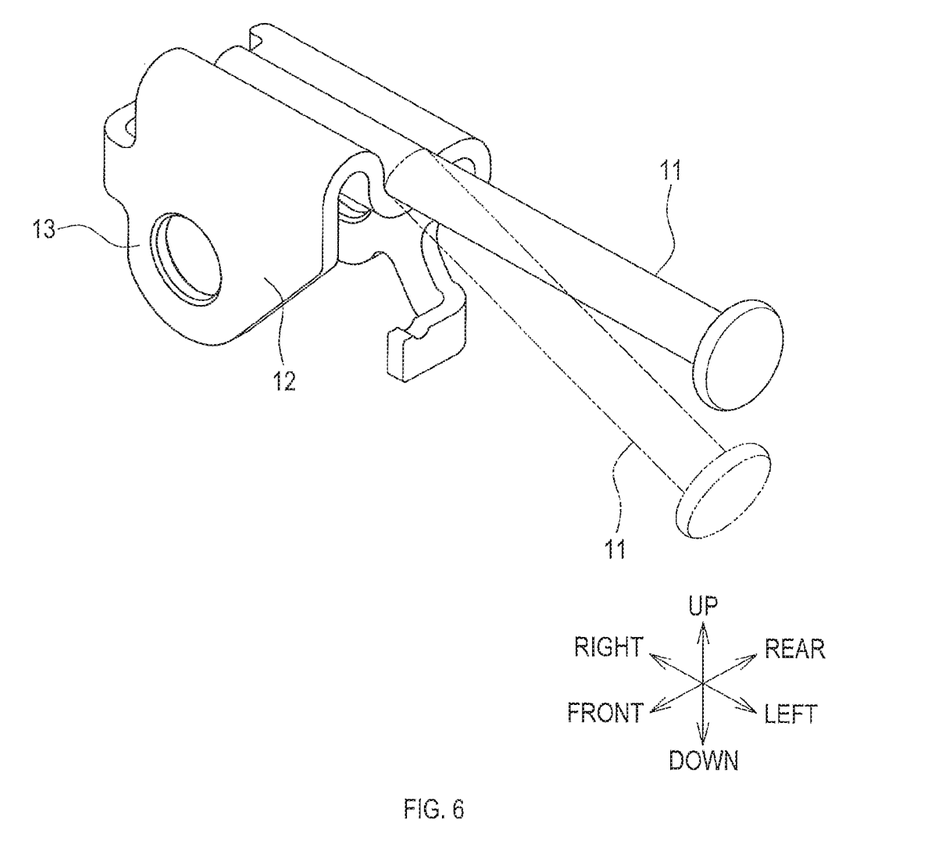
FIG. 6 is a view showing a deformed state of the striker of the first embodiment.

With the above configuration, the load acting on the engagement pin 11 in the seat front direction acts on the engagement pin 11 as a force to mainly bend and deform the engagement pin 11 (see, FIG. 6). Therefore, occurrence of a large shearing force in the weld bead W2 can be inhibited, which can therefore enhance the strength of the striker 10.

The mounting bracket 12 is provided with the curved portion 15 that can receive the load acting on the second load receiving portion 14B and that is curved in approximately the U-shape. With this configuration, if a large load acts on the engagement pin 11 in the seat front-rear directions, the curved portion 15 is deformed to thereby absorb the load. Accordingly, occurrence of a large shearing force in the weld bead W2 can be inhibited, which can therefore enhance the strength of the striker 10.

Second Embodiment

Figure 7:
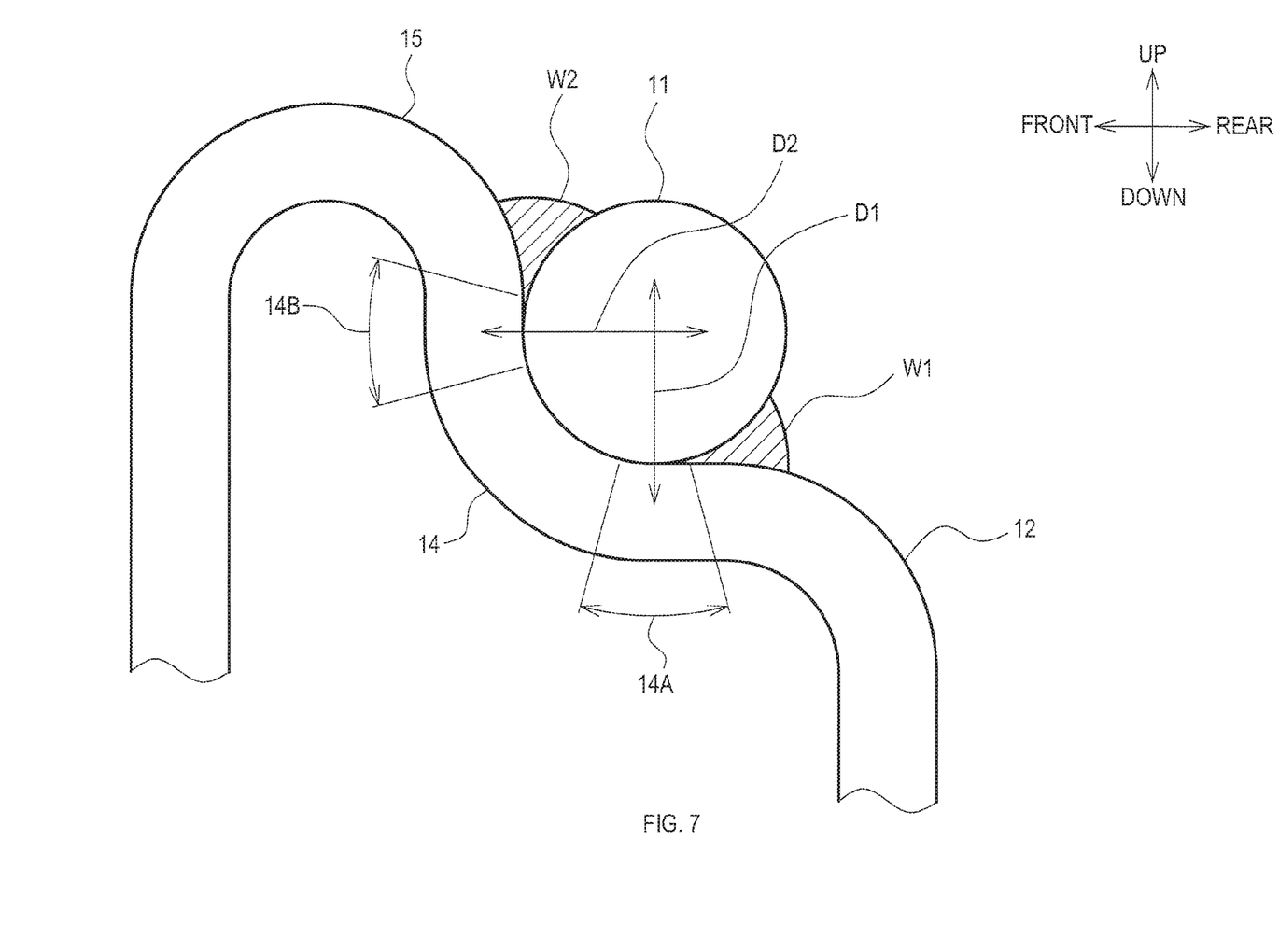
FIG. 7 is a view showing a striker of a second embodiment.

As shown in FIG. 7, the covering portion 14 of the present embodiment covers a smaller area of the engagement pin 11 than the covering portion 14 of the first embodiment does. Specifically, the covering portion 14 of the present embodiment is configured to cover an area of approximately a 90-degree range. The same constituent features and the like as in the above-described embodiment are labelled with the same reference numerals in the above-described embodiment. Therefore, overlapping descriptions are omitted in the present embodiment.

Third Embodiment

Figure 8:
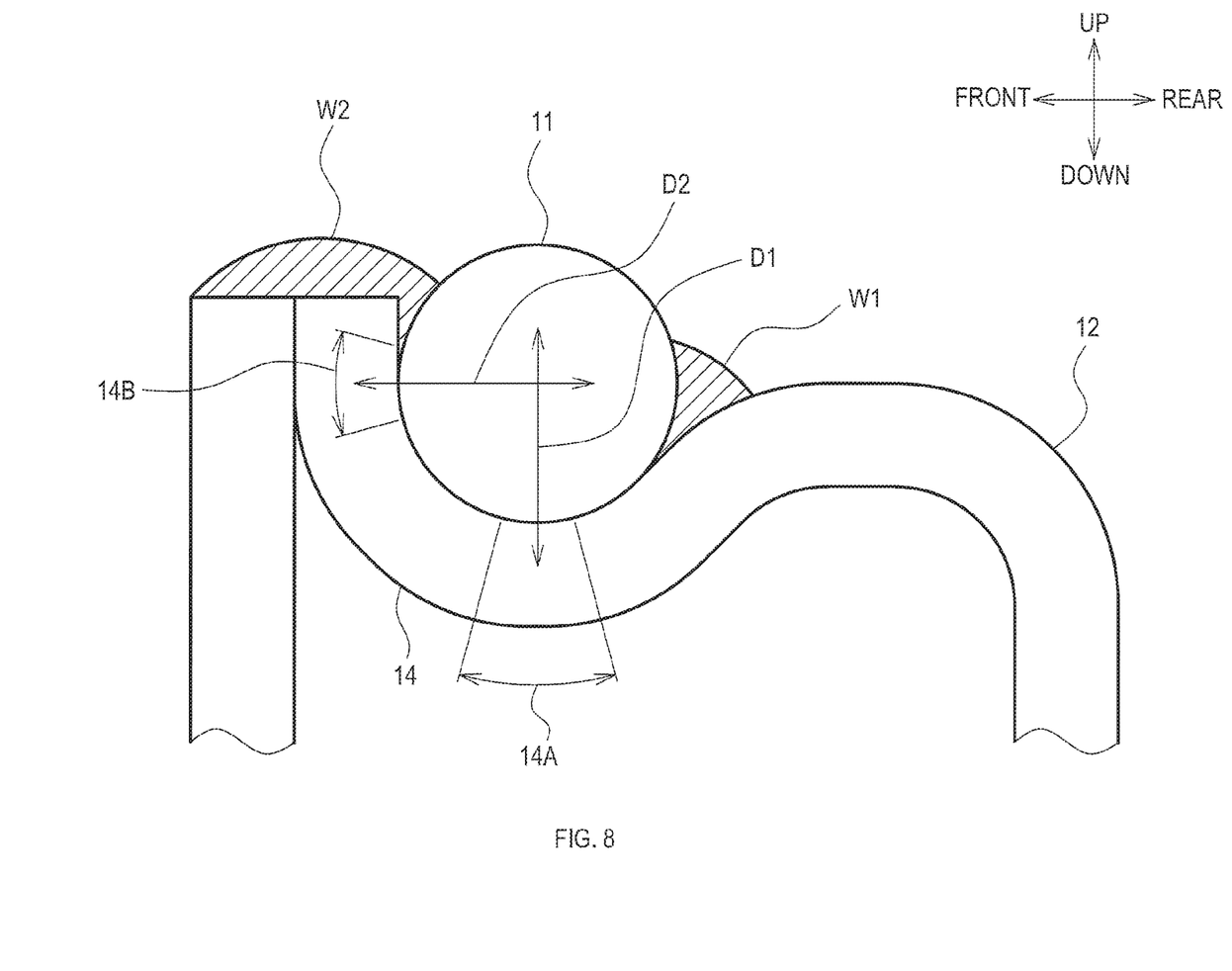
FIG. 8 is a view showing a striker of a third embodiment.

As shown in FIG. 8, the mounting bracket 12 of the present embodiment is configured without the curved portion 15. The same constituent features and the like as in the above described embodiments are labelled with the same reference numerals in the above-described embodiments. Therefore, overlapping descriptions are omitted in the present embodiment.

OTHER EMBODIMENTS

The striker 10 of each of the above-described embodiments is configured to be mounted to the vehicle seat 1. However, the present disclosure is not limited hereto. Specifically, the present disclosure may be configured, for example, such that the engagement device 6 is mounted to the vehicle seat 1, whereas the striker 10 is mounted to a vehicle body.

The mounting bracket 12 of the above-described embodiments are configured to be rotatable with respect to the vehicle seat 1. However, the present disclosure is not limited hereto. Specifically, the present disclosure may be configured, for example, such that the engagement pin 11 is always placed in the engagement position.

In the above-described embodiments, the second load receiving portion 14B is configured to be situated on the seat front side compared to the engagement pin 11 in the state where the mounting portion 13 is mounted. However, the present disclosure is not limited hereto.

Specifically, the present disclosure may be configured, for example, such that the second load receiving portion 14B is situated on a seat rear side compared to the engagement pin 11 in the state where the mounting portion 13 is mounted, or such that the second load receiving portion 14B is provided two in number to the covering portion 14 on the seat front side compared to the engagement pin 11 and on the seat rear side compared to the engagement pin 11 in the state where the mounting portion 13 is mounted.

In the above-described embodiments, the vehicle seat of the present disclosure is applied to a vehicle. However, application of the invention of the present disclosure should not be limited to a vehicle seat for a vehicle and may be applied to seats used in other vehicles, such as railroad vehicles, ships and boats, and aircrafts. Further, the present disclosure may be applied to built-in seats used in theaters, households, and the like.

Furthermore, the present disclosure may be configured in combination of at least two of the above-described embodiments or may be the above-described embodiments configured without either the configuration requirements described in the above embodiments.

What is claimed is:

1. A striker applied to a vehicle seat comprising:
an engagement pin that is formed of metal and has a bar shape with a single longitudinal axis, wherein the engagement pin extends axially along the single longitudinal axis from a first terminal end of the bar shape to a second terminal end of the bar shape, the second terminal end being spaced from the first terminal end in a vehicle seat left-right direction; and
a mounting bracket to which the engagement pin is fixed, the mounting bracket including:
a covering portion that covers a part of a lateral surface of the engagement pin and to which one end portion of the engagement pin along the longitudinal axis of the engagement pin is fixed; and
a mounting portion that is configured for attachment to a vehicle seat or a vehicle and that is mounted to the vehicle seat or the vehicle,
wherein, when directions perpendicular to the longitudinal axis of the engagement pin are regarded as first directions and directions approximately corresponding to seat front-rear directions are regarded as second directions in a state where the mounting portion is mounted, the first directions being perpendicular to the second directions,
wherein the covering portion is provided with a first load receiving portion transverse to the first directions and a second load receiving portion transverse to the second directions,
wherein the mounting bracket is provided with a curved portion,
wherein the covering portion, the curved portion, and the mounting portion comprise a first end, middle, and second end of an S-shape, respectively, the S-shape defined in a central plane of the mounting bracket, wherein the central plane is perpendicular to the left-right direction, and
wherein the curved portion extends beyond the engagement pin in the first directions opposite the first load receiving portion with respect to the engagement pin.

2. The striker according to claim 1,
wherein, in the state where the mounting portion is mounted, the second load receiving portion is situated on a seat front side compared to the engagement pin, and
wherein the second load receiving portion is provided with a weld bead that joins the second load receiving portion and the engagement pin to each other.

3. The striker according to claim 2,
wherein, in the state where the mounting portion is mounted, there is no portion in the mounting bracket that is situated on a seat ear side compared to the engagement pin and transverse to the seat front-rear directions.

4. The striker according to claim 1,
wherein the curved portion receives a load acting on the second load receiving portion and is curved in approximately a U-shape.

5. The striker according to claim 4,
wherein the covering portion and the curved portion are a one-piece article that is formed with a single metal plate.

6. The striker according to claim 5,
wherein the engagement pin has a cylindrical shape,
wherein the covering portion is arcuately curved to follow an outer circumferential surface of the engagement pin, and
wherein the covering portion and the curved portion are a one-piece article formed with a single metal plate that is curved to draw approximately the letter S.

7. The striker according to claim 2,
wherein the curved portion receives a load acting on the second load receiving portion and is curved in approximately a U-shape.

8. The striker according to claim 7,
wherein the covering portion and the curved portion are a one-piece article that is formed with a single metal plate.

9. The striker according to claim 8,
wherein the engagement pin has a cylindrical shape,
wherein the covering portion is arcuately curved to follow an outer circumferential surface of the engagement pin, and
wherein the covering portion and the curved portion are a one-piece article formed with a single metal plate that is curved to draw approximately the letter S.

10. The striker according to claim 3,
wherein the curved portion receives a load acting on the second load receiving portion and is curved in approximately a U-shape.

11. The striker according to claim 10,
wherein the covering portion and the curved portion are a one-piece article that is formed with a single metal plate.

12. The striker according to claim 11,
wherein the engagement pin has a cylindrical shape,
wherein the covering portion is arcuately curved to follow an outer circumferential surface of the engagement pin, and
wherein the covering portion and the curved portion are a one-piece article formed with a single metal plate that is curved to draw approximately the letter S.

* * * * *